June 13, 1961     W. W. HIGGINBOTHAM     2,988,372
INTERCONNECTED AIR SUSPENSION SYSTEM
Filed Jan. 27, 1959     2 Sheets-Sheet 1
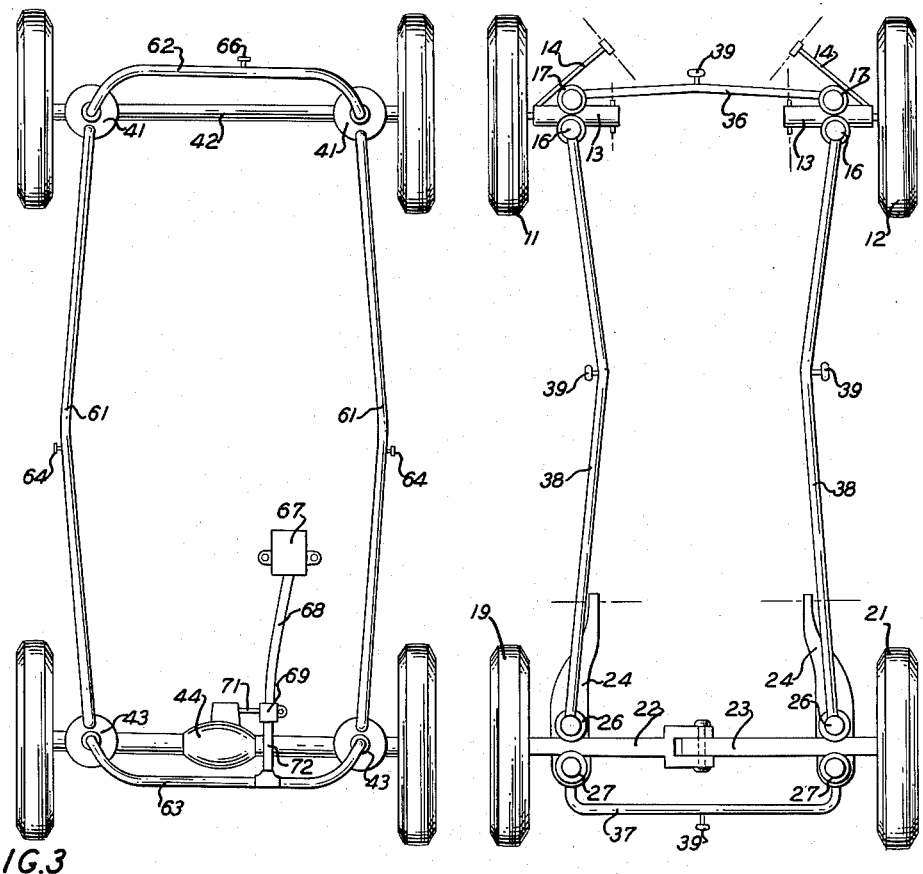
FIG. 1
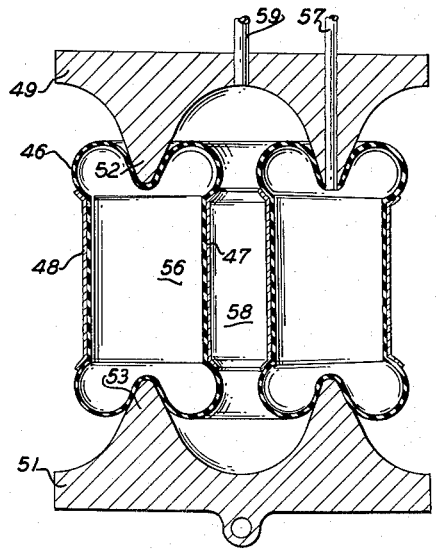
FIG. 3
FIG. 4
W. W. HIGGINBOTHAM
INVENTOR.
BY J. R. Faulkner
    J. H. Oster
ATTORNEYS June 13, 1961 W. W. HIGGINBOTHAM 2,988,372
INTERCONNECTED AIR SUSPENSION SYSTEM
Filed Jan. 27, 1959 2 Sheets-Sheet 2

W. W. HIGGINBOTHAM
INVENTOR.

ATTORNEYS

United States Patent Office 2,988,372
Patented June 13, 1961

2,988,372
INTERCONNECTED AIR SUSPENSION SYSTEM

William W. Higginbotham, Britton, Mich., assignor to Ford Motor Company, Dearborn, Mich., a corporation of Delaware
Filed Jan. 27, 1959, Ser. No. 789,349
4 Claims. (Cl. 280—104)

This application relates to an air suspension system for motor vehicles, and has particular reference to a system in which the air springs at the road wheels are interconnected.

In an embodiment of the invention, each of the front and rear road wheels is resiliently connected to the vehicle frame by means of either a pair of separate air springs or a single dual chamber air spring. These air springs or air chambers are interconnected in such manner as to form four separate and independent air systems, including two side systems, a front system, and a rear system. Each air system includes a pair of air springs or chambers and an interconnecting conduit. The side air systems are charged with air at a higher pressure than the front and rear air systems, and provide roll control as well as controlling the height of the sides of the vehicle. The rear air system may be provided with an automatic leveling control, and the front air system may also be provided with leveling control means if desired.

Among the advantages of the interconnected air system of the present invention are the reduction of manufacturing costs, reduction of air leakage problems, and an improvement in the ride characteristics of the vehicle. A balanced flat ride with decreased vehicle pitch is possible with this system, and low dynamic ride frequencies are obtained. In addition, roll control is achieved.

Other objects and advantages of this invention will be made more apparent as this description proceeds, particularly in connection with the accompanying drawings, in which:

FIGURE 1 is a semi-diagrammatic plan view of a motor vehicle chassis incorporating the present invention;

FIGURE 3 is a semi-diagrammatic plan view of a modification;

FIGURE 4 is a cross-sectional view through one of the dual chamber air springs of FIGURE 3;

Figure 2:
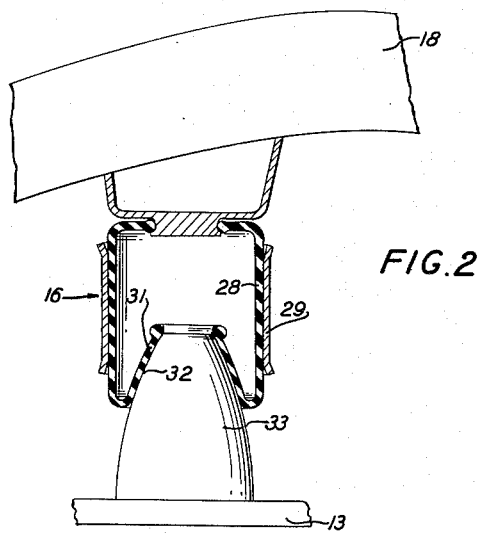
FIGURE 2 is a fragmentary cross-sectional view of one of the air springs.

Referring now to the drawings, and particularly to FIGURES 1 and 2, the reference characters 11 and 12 indicate the left and right front road wheels of a motor vehicle. These wheels are conventionally independently suspended upon suspension arms 13 having forwardly extending control arms 14. A pair of air springs 16 and 17 are located adjacent each of the front road wheels 11 and 12, and resiliently connect the wheels to the vehicle frame. The air springs are supported between the suspension arms 13 and the frame 18.

Left and right rear road wheels 19 and 21 are carried at the outer ends of swing axles 22 and 23 respectively. The axles are secured to trailing arms 24 pivotally connected at their forward ends to the vehicle frame. A pair of air springs 26 and 27 resiliently connect each of the rear road wheels 19 and 21 to the vehicle frame. The air springs are supported between the trailing arms 24 and the frame 18.

With particular reference to FIGURE 2, it will be noted that the air springs are of the variable rate type in which a resilient air bag 28 is restrained intermediate its ends by a metal band 29, and in which the lower end 31 of the air spring is adapted to be positioned adjacent a curved upper surface 32 of a pedestal 33 carried by the suspension arm 13. The effective diameter of the air bag 28 changes as the adjacent road wheel moves in jounce and rebound, depending upon the portion of the air bag in contact with the curved surface of the pedestal.

The front air springs 17 at opposite sides of the vehicle are interconnected by a conduit 36, while the rear air springs 27 at opposite sides of the vehicle are similarly interconnected by a conduit 37. At each side of the vehicle a conduit 38 interconnects the front air spring 16 at that side of the vehicle with the rear air spring 26 at the same ride. Each of the conduits 36, 37 and 38 is provided with an air valve 39 to permit air to be admitted into or discharged from the particular conduit.

It will be noted that the construction thus described consists of four separate and independent air suspension systems, including two side air systems, a front air system, and a rear air system. Each system consists of two air springs at different wheels, plus an interconnecting conduit. The individual systems can be charged with air from a suitable source to any desired pressures, but it has been found advantageous to charge the side air systems to a higher pressure than the front and rear systems. The air valves 39 enable air to be admitted into or discharged from the individual systems to adjust the riding height of the vehicle to compensate for load changes or air leakage and also to change the riding trim of the various portions of the vehicle.

This arrangement of interconnection between the various air springs provides extremely low dynamic ride frequencies for comparatively high air spring rates. Forces exerted upon any one road wheel are transferred to the two adjacent corners of the vehicle to provide a flat ride. The air transfer between the front and rear air springs at each side of the vehicle decreases the tendency of the vehicle to pitch, and the independence of the two high pressure side air systems from each other provides roll control. The variable rate air springs provide leveling, and insure the return of the vehicle to its normal trim position.

The modification shown in FIGURES 3 and 4 is generally similar to that shown in FIGURE 1 except that a single dual chamber air spring is provided at each wheel in lieu of two separate air springs. Front dual chamber air springs 41 are mounted upon the front axle 42 adjacent each front wheel. Similar rear dual chamber air springs 43 are mounted upon the rear axle 44. FIGURE 4 illustrates in cross-section one of these dual chamber air springs, and it will be seen that it comprises an annular toroidal shaped resilient air bag 46 having its intermediate portion restricted by inner and outer metal bands 47 and 48 of circular shape. The air bag 46 is supported between upper and lower supports 49 and 51 which are respectively connected to sprung and unsprung portions of the vehicle. For example, the upper support 49 may be connected to the vehicle frame, while the lower support 51 may be connected to a vehicle axle. The upper and lower supports 49 and 51 have similar annular protruding ribs 52 and 53 engaging and supporting the upper and lower portions respectively of the air bag 46.

From the foregoing, it will be seen that each air spring has two separate independent air chambers. The first air chamber 56 is formed within the annular air bag 46 and is provided with a conduit 57 through the upper support 49. A second smaller air chamber 58 is formed in the center of the annular air bag 46 between the upper and lower supports 49 and 51. The center chamber 58 is connected to a conduit 59 extending through the central portion of the upper support 47.

Interconnecting conduits are provided between the four dual chamber air springs to form four separate air systems, including a front system, two side systems, and a rear system. The side systems utilize the large annular air chambers 56 of the air springs, with an interconnecting conduit 61 being provided at each side of the vehicle to interconnect the air springs at the front and rear of that side. The front air system utilizes an interconnecting conduit 62 to connect the small central air chambers 58 of the front air springs 41 at opposite sides of the vehicle. Similarly, the rear air system utilizes a conduit 63 interconnecting the small central air chambers 58 of the rear air springs 43 at opposite sides of the vehicle. Air valves 64 permit the conduits 61 and interconnected air chambers of the side air systems to be charged with air at a relatively high pressure. A similar valve 66 is provided for the conduit 62 and the interconnected air chambers 58 of the front air system, but this system is preferably charged with air at a considerably lower pressure.

The rear air system is provided with a separate air source such as an air compressor 67 connected by a conduit 68 to a conventional leveling valve 69 which is connected by means of a control link 71 to the rear axle 44 to be responsive to variations in the height of the rearward portion of the vehicle. The conduit 72 connects the leveling valve 69 to the interconnecting conduit 63 of the rear air system.

It will be noted that the modification shown in FIGURE 3 will operate in the same manner as that shown in FIGURE 1, the primary difference being in the provision of dual chamber air springs and the addition of an automatic leveling control for the rear air system.

Figure 5:
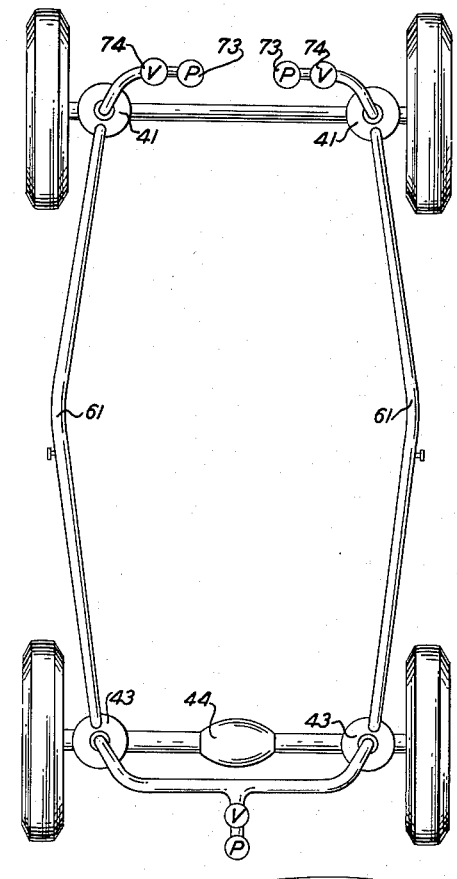
FIGURE 5 is a plan view of another modification.

If desired, the vehicle may be provided with a three point leveling control arrangement. To accomplish this the forward portion of the modification shown in FIGURE 3 is altered, as shown in FIGURE 5, to separate the low pressure inner chambers 58 of the front air springs 41 and to provide each with a source of air pressure 73 and a leveling valve 74. This modification retains the major portion of the ride characteristics of the completely interconnected system, yet provides three point leveling control for transverse as well as longitudinal leveling.

With the above constructions, the major portion of the vehicle load is carried by the larger high pressure air chambers 56 forming part of the side air systems, while the leveling for load variations due to the ingress and egress of passengers or baggage is provided for by the relatively small low pressure chambers 58 of the front and rear air systems.

It will be understood that the invention is not to be limited to the exact construction shown and described, but that various changes and modifications may be made without departing from the spirit and scope of the invention, as defined in the appended claims.

What is claimed is:

1. In a motor vehicle having a frame and front and rear road wheels, a pair of side air suspension systems one at each side of said vehicle, each of said side systems including an air spring resiliently connecting a front road wheel to said frame and an air spring resiliently connecting a rear road wheel to said frame and a conduit interconnecting said air springs, a front air suspension system at the front of said vehicle, said front system including a pair of air springs each resiliently connecting one of said front road wheels to said frame and a conduit interconnecting said last named front air springs, and a rear air suspension system, said rear system including a pair of air springs each resiliently connecting one of said rear road wheels to said frame and a conduit interconnecting said last named air springs, said four air systems being separate and independent from each other, said side air systems being charged with a substantially higher pressure than said front and rear air systems.

2. In a motor vehicle having a frame and front and rear road wheels, a pair of side air suspension systems one at each side of said vehicle, each of said side systems including an air spring resiliently connecting a front road wheel to said frame and an air spring resiliently connecting a rear road wheel to said frame and a conduit interconnecting said air springs, a front air suspension system at the front of said vehicle, said front system including a pair of air springs each resiliently connecting one of said front road wheels to said frame and a conduit interconnecting said last named front air springs, and a rear air suspension system, said rear system including a pair of air springs each resiliently connecting one of said rear road wheels to said frame and a conduit interconnecting said last named air springs, said side air systems being charged with a substantially higher pressure than said front and rear air systems, said four air systems being separate and independent from each other, three of said air systems being closed systems, a source of air pressure for the fourth of said air systems, and leveling valve means responsive to variations in the height of one portion of said vehicle to admit air into or exhaust air from said fourth air system.

3. In a motor vehicle having a frame and front and rear road wheels, an air spring resiliently connecting each of said road wheels to said frame, each of said air springs having an upper and a lower support, a resilient member of toroidal cross-section between the upper and lower supports of each of said air springs forming a first air chamber between the radially inner and outer walls of the toroid and a second air chamber within the radially inner wall of the toroid, said first and second chambers being independent and non-interconnected, means interconnecting one of said air chambers of each front air spring to one of said air chambers of the rear air spring at the same side of the vehicle to provide a pair of separate air systems one at each side of the vehicle means connecting the other of said air chambers of said front air springs to provide a separate front air system, and means interconnecting the other of said air chambers of said rear air springs to provide a separate rear air system, said front and rear air systems being charged with a substantially different pressure than said side air systems.

4. The structure defined by claim 3 which is further characterized in that leveling valve means responsive to the height of the vehicle is connected to at least one of said air systems to control the admission of air into and the exhaust of air from said system.

References Cited in the file of this patent

UNITED STATES PATENTS

| | | |
|---|---|---|
| 1,066,712 | Cooper | July 8, 1913 |
| 1,104,294 | Erickson | July 21, 1914 |
| 1,847,252 | Miller | Mar. 1, 1932 |

FOREIGN PATENTS

| | | |
|---|---|---|
| 1,055,080 | France | Oct. 14, 1953 |
| 556,890 | Italy | Feb. 9, 1957 |